(12) United States Patent
Ploss et al.

(10) Patent No.: US 10,837,851 B2
(45) Date of Patent: Nov. 17, 2020

(54) MEASUREMENT DEVICE AND METHOD FOR ASCERTAINING A PRESSURE IN A MEASUREMENT VOLUME

(71) Applicant: DIEHL METERING GMBH, Ansbach (DE)

(72) Inventors: Peter Ploss, Bayreuth (DE); Michael Mayle, Ansbach (DE); Andreas Benkert, Ansbach (DE); Michael Ponschab, Erlangen (DE)

(73) Assignee: Diehl Metering GmbH, Ansbach (DE)

( * ) Notice: Subject to any disclaimer, the term of this patent is extended or adjusted under 35 U.S.C. 154(b) by 0 days.

(21) Appl. No.: 16/160,309

(22) Filed: Oct. 15, 2018

(65) Prior Publication Data
US 2019/0154531 A1    May 23, 2019

(30) Foreign Application Priority Data

Nov. 21, 2017    (DE) .................. 10 2017 010 727

(51) Int. Cl.
| | |
|---|---|
| *G01L 11/06* | (2006.01) |
| *G01F 1/66* | (2006.01) |
| *G01F 1/708* | (2006.01) |

(52) U.S. Cl.
CPC ............... *G01L 11/06* (2013.01); *G01F 1/66* (2013.01); *G01F 1/666* (2013.01); *G01F 1/7082* (2013.01)

(58) Field of Classification Search
CPC ... G01L 19/147; G01L 9/0042; G01L 9/0054; G01L 9/0072; G01L 13/025; G01L 19/04;
(Continued)

(56) References Cited

U.S. PATENT DOCUMENTS

| | | |
|---|---|---|
| 3,977,252 A | 8/1976 | Krylova et al. |
| 6,073,491 A | 6/2000 | Fischer et al. |

(Continued)

FOREIGN PATENT DOCUMENTS

| | | |
|---|---|---|
| DE | 2946662 A1 | 5/1981 |
| DE | 19820877 C2 | 9/2002 |

(Continued)

OTHER PUBLICATIONS

Stuart W. Wenzel et al. "A Multisensor Employing an Ultrasonic Lamb-Wave Oscillator" IEEE Transactions on Electron Device, vol. 35, No. 6, Jun. 1988, New York, USA, XP00005153.

*Primary Examiner* — Andre J Allen
(74) *Attorney, Agent, or Firm* — Laurence A. Greenberg; Werner H. Stemer; Ralph E. Locher

(57) ABSTRACT

A measurement device for ascertaining a pressure in a measurement volume which receives a fluid or through which fluid flows. The measurement volume is bounded at least sectionally by a side wall and a vibration transducer is arranged on the side wall. The vibration transducer is actuable by a control device of the measurement device to excite a wave that is guided through the side wall. The guided wave is able to be guided through the side wall along a propagation path back to the vibration transducer or to at least one further vibration transducer and it is captured there by the control device in order to ascertain measurement data. The pressure in the measurement volume is then ascertained by the control device in dependence on the measurement data.

15 Claims, 3 Drawing Sheets

(58) Field of Classification Search
CPC . G01L 19/14; G01L 19/0038; G01L 19/0084; G01L 9/0075; G01L 19/0069; G01L 19/0618; G01L 9/0055; G01L 9/0073; G01L 19/0092; G01L 19/0645; G01L 19/143; G01L 9/0051; G01L 9/0052; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/16; G01L 7/00; G01L 7/163; G01L 7/166; G01L 9/0047; G01L 9/12; G01L 11/02; G01L 13/00; G01L 15/00; G01L 19/003; G01L 19/0609; G01L 19/083; G01L 19/10; G01L 19/145; G01L 19/148; G01L 27/005; G01L 7/08; G01L 7/082; G01L 9/0045; G01L 9/0048; G01L 9/006; G01L 9/007; G01L 9/0076; G01L 9/04; G01L 9/045; G01L 9/06; G01L 9/065; G01L 9/125; G01L 11/00; G01L 17/00; G01L 19/00; G01L 19/0015; G01L 19/0076; G01L 19/02; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16; G01F 1/667; G01F 1/662; G01F 1/66; G01F 1/74; G01F 25/0007; G01F 1/668; G01F 1/712; G01F 15/006; G01F 15/022; G01F 15/06; G01F 15/061; G01F 15/063; G01F 1/00; G01F 1/002; G01F 1/663; G01F 1/6847; G01F 1/7082; G01F 1/8413; G01F 1/86; G01F 23/2928; G01F 23/296
See application file for complete search history.

(56) References Cited

U.S. PATENT DOCUMENTS

| | | | | |
|---|---|---|---|---|
| 6,889,562 | B2* | 5/2005 | Gysling | G01F 1/7086 73/861.42 |
| 7,127,360 | B2* | 10/2006 | Gysling | G01F 1/74 702/45 |
| 7,237,440 | B2* | 7/2007 | Gysling | G01F 1/666 73/861 |
| 7,377,173 | B2 | 5/2008 | Flik et al. | |
| 7,503,227 | B2* | 3/2009 | Davis | G01F 1/66 73/861.42 |
| 7,624,650 | B2* | 12/2009 | Gysling | G01F 1/662 73/861.27 |
| 7,624,651 | B2* | 12/2009 | Fernald | G01F 1/7082 73/861.27 |
| 2010/0031755 | A1* | 2/2010 | Bitto | G01F 1/8413 73/861.357 |
| 2010/0095782 | A1* | 4/2010 | Ferencz | G01F 1/66 73/861.28 |
| 2014/0260667 | A1* | 9/2014 | Berkcan | G01F 1/66 73/861.28 |
| 2016/0320219 | A1* | 11/2016 | Hellevang | G01F 1/662 |
| 2018/0356046 | A1* | 12/2018 | Gong | F17D 5/06 |
| 2020/0096484 | A1* | 3/2020 | Cattaneo | G01N 29/222 |

FOREIGN PATENT DOCUMENTS

| | | |
|---|---|---|
| DE | 10310114 A1 | 9/2004 |
| DE | 102005009818 A1 | 9/2006 |
| EP | 0088362 A1 | 9/1983 |
| EP | 0072330 B1 | 7/1989 |
| JP | 2001116640 A | 4/2001 |
| JP | 2002296133 A | 10/2002 |

\* cited by examiner

US 10,837,851 B2

MEASUREMENT DEVICE AND METHOD FOR ASCERTAINING A PRESSURE IN A MEASUREMENT VOLUME

CROSS-REFERENCE TO RELATED APPLICATION

This application claims the priority, under 35 U.S.C. § 119, of German patent application DE 10 2017 010 727.0, filed Nov. 21, 2017; the prior application is herewith incorporated by reference in its entirety.

BACKGROUND OF THE INVENTION

Field of the Invention

The invention relates to a measurement device for ascertaining a pressure in a measurement volume which receives a fluid or through which a fluid flows. The measurement volume is bounded at least sectionally by a side wall. The invention also relates to a method for ascertaining a pressure in a measurement volume.

Many approaches for capturing properties of a fluid, that is to say of a gas or a liquid, in pipelines are known. For example, flow rates and possibly other fluid properties can be captured by a flow meter, for example by an ultrasonic meter. If a pressure of the fluid is to be captured, a separate pressure sensor is required. For example, it is possible for diaphragms can be in contact with the liquid and the pressure can be capacitively or inductively captured based on a deformation of the diaphragm. The use of such a pressure measurement in a flow meter, however, increases the complexity and consequently the costs of the flow meter. In addition, the pressure sensor must be in direct contact with the fluid, which is why it is potentially necessary for example in water meters for the sensor to be sealed off, which adds outlay, and/or for the materials used to satisfy specific requirements because they are in contact with drinking water during operation.

SUMMARY OF THE INVENTION

It is accordingly an object of the invention to provide a measurement device and a corresponding method which overcome the above-mentioned and other disadvantages of the heretofore-known devices and methods of this general type and which provide for the possibility for measuring a pressure in a measurement volume that is technologically simple to implement and is in particular able to be integrated in the flow meter with little technological outlay.

With the foregoing and other objects in view there is provided, in accordance with the invention, a measurement device for ascertaining a pressure in a measurement volume containing a fluid. The measurement device comprises:

a side wall bounding at least a section of the measurement volume;

a vibration transducer disposed on said side wall of the measurement volume;

a control device configured to actuate said vibration transducer for exciting a wave to be guided through said side wall, wherein the guided wave is guided through said side wall along a propagation path back to said vibration transducer, or to a further vibration transducer connected to said control device, where the guided wave is captured and said control device ascertains measurement data; and wherein said control device is configured to determine the pressure in the measurement volume in dependence on the measurement data.

In other words, the objects of the invention are achieved by a measurement device of the type mentioned in the introductory part, wherein a vibration transducer is arranged on the side wall, wherein the vibration transducer is actuable by a control device of the measurement device to excite a wave that is guided through the side wall, wherein the guided wave is able to be guided through the side wall along a propagation path back to the vibration transducer or to at least one further vibration transducer and is capturable there by the control device in order to ascertain measurement data, wherein the pressure is ascertainable by the control device in dependence on the measurement data.

The invention is based on the concept of measuring a pressure in the measurement volume by ascertaining an influence said pressure has on a wave that is guided in a side wall bounding the measurement volume and by determining the pressure in dependence thereon. In this case, advantage is taken of the fact that a pressure in the measurement volume exerts a force on the side wall, which results in mechanical stress in the side wall. Owing to this stress, the properties of the side wall in respect of the wave guidance change. In particular, the sound velocity in the wall changes owing to the acoustoelastic effect, making it possible to ascertain a wall stress and consequently the pressure for example by way of a time-of-flight measurement.

It is hereby possible to ascertain for example a time period until the guided wave returns along the propagation path to the vibration transducer or until it reaches a further vibration transducer. To this end, the guided wave can be emitted for example with a pulse-type envelope, with the result that times of flight can be easily ascertained. Alternatively or additionally, however, other measurement data can be evaluated, for example a pulse shape or a shape of the envelope of the guided wave, a phase position of the received wave relative to a reference wave having in particular a defined phase position with respect to the emitted wave, or the like. The described measurement data can also be captured in spectrally resolved fashion, for example in order to distinguish between different vibration modes of the guided wave. It is likewise possible to use a plurality of vibration transducers for capturing the measurement data, which are in particular arranged on the side wall at a distance from one another. This can serve for validating the measurement and/or for improving the measurement accuracy. The connection between the time of flight and the pressure in the measurement volume can be calibrated once for the individual measurement device or for a group of measurement devices of substantially identical construction, and corresponding calibration data can be used during the measurement operation in order to ascertain a pressure from the time of flight. The pressure can be ascertained exclusively from the measurement data, although it is also possible to take into account further parameters of the fluid, such as an instantaneous flow rate, a fluid temperature, a composition of the fluid or a type of the fluid or the like. Additionally or alternatively, parameters of the side wall, in particular the material and/or thickness thereof, and/or of the vibration transducers, in particular the relative position or distance with respect to one another, can be taken into account.

The side wall may in particular form a measurement pipe through which the fluid may flow or a part of such a measurement pipe. For example, the side wall can be part of the measurement pipe of a flow meter. The side wall can consist for example of plastic or metal or a composite, which can comprise glass fibres, for example.

The vibration transducer preferably is an ultrasonic transducer. A pure mode excitation of a guided wave or an excitation of a few modes is preferably effected. The guided wave can be, for example, a Rayleigh wave, a quasi-Scholte wave or a Lamb wave. If an excitation is effected at a frequency at which only the base modes are excitable, a substantially pure mode excitation can be facilitated. A mode selectivity can be achieved for example by specifying a spatial frequency, for example by way of using an interdigital transducer or using a plurality of spaced-apart excitation elements. A pure mode excitation is advantageous because different vibration modes typically propagate in the side wall at different propagation velocities, which can potentially make the evaluation of the measurement data more difficult.

In accordance with an added feature of the invention, the side wall has at least one attenuation element by way of which the guided wave is able to be attenuated and/or the side wall can have at least one reflection element by way of which the guided wave is able to be at least partially reflected. By using at least one attenuation element or at least one reflection element, the guided wave can be guided substantially along exactly one propagation path or along a specified low number of propagation paths back to the vibration transducer or to the further vibration transducer. Hereby, the evaluation of the measurement data for ascertaining the pressure can be facilitated. In particular, the propagation path can be laterally bounded by the at least one attenuation element or the at least one reflection element.

The attenuation element can be formed by an attachment of a material having high internal friction, for example a foam, to the side wall. Alternatively, it is possible for attenuating the guided wave to use a plurality of reflection elements having spacings which are selected such that at least one of the excited vibration modes of the guided wave interferes destructively.

A reflection element can be realized in particular by way of the thickness of the side wall changing, in particular in the manner of steps. The attenuation element and/or the reflection element can be formed by the side wall having at least one cutout and/or at least one protrusion. In particular, the cutout or the protrusion can be arranged at the side of that side wall on which the vibration transducer or the vibration transducers is or are arranged, in particular on a side of the side wall that is remote from the measurement volume. In the boundary region of the cutout or of the protrusion, the thickness of the side wall can change in particular in the manner of a step. Hereby, the acoustic impedance for the guidance of the guided wave suddenly changes, which results in reflections. By providing a plurality of protrusions or cutouts, it is possible, as explained above, to realize destructive interference and thus attenuation of specific modes.

In accordance with an additional feature of the invention, propagation path is bounded at least in one section of the propagation path laterally by the attenuation element and/or the reflection element. In particular, the propagation path can be bounded over its entire length by the attenuation element or the reflection element. A lateral boundary is understood to mean a boundary in a transverse direction that is perpendicular to the longitudinal direction of the propagation path or a main propagation direction of the guided wave. By bounding the propagation path, it can be ensured that the guided wave can be guided from the vibration transducer back to the vibration transducer or to the further vibration transducer only along exactly one propagation path or along a specified group of propagation paths. This facilitates the evaluation of the measurement data, since uncontrolled multi-path propagations can be avoided. In addition, it can be ensured hereby that the guided wave is guided purposefully along a propagation path which is relatively long, with the result that even relatively minor changes in the sound velocity for a specific mode can result in considerable changes of the measurement data.

In accordance with a further feature of the invention, side wall has a different wall thickness in the region of the propagation path than in a section of the side wall that is adjacent to the region of the propagation path. In particular, the side wall can then be thicker or thinner in the region of the propagation path than at any other locations of the measurement region. By changing the wall thickness of the side wall at the edges of the propagation path, reflections arise here, as already mentioned above as regards the reflection elements, which reflections can be used to guide the guided wave on a defined propagation path or on a plurality of defined propagation paths. The wall thickness in regions of the propagation path is preferably thinner than in an adjacent section of the side wall, since it is easier in the case of relatively thin side walls, as will be explained later in more detail, to excite guided waves in the side wall which are substantially not coupled into the fluid, as a result of which additional propagation paths and attenuation of the guided wave can be avoided.

The side wall can in particular have a substantially constant thickness in the region of the propagation path, wherein the thickness of the side wall outside the propagation path differs from said thickness.

In accordance with a further feature of the invention, the side wall forms a measurement pipe surrounding the measurement volume. Here, the propagation path extends at least once in the circumferential direction around the measurement pipe. For example, a round or elliptic measurement pipe can be used. The propagation path can extend around the measurement volume or the measurement pipe in the manner of a ring, wherein said ring can be distorted in the longitudinal direction of the pipe such that for example an ellipse which circulates at an angle to the flow direction or a distorted ellipse or a cone shape can be formed. Such a shape is advantageous in particular if the guided wave is intended to be guided back to the same vibration transducer. If the guided wave is intended to be guided to a further vibration transducer, the propagation path can extend for example helically around the measurement pipe. If the propagation pass extends at least once around the measurement volume, it is possible to ensure that an anisotropic pressure distribution on the side wall, for example due to the fluid path through the measurement pipe or due to turbulence of the flow, is averaged out of the measurement data by taking the average over the entire pipe circumference. Consequently, the measurement values are a better indicator of the hydrostatic pressure in the measurement pipe if the propagation path extends at least once around the measurement pipe.

In accordance with a preferred embodiment of the invention, the propagation path extends around the measurement pipe more than once. It is possible hereby to ensure that the path length travelled by the guided wave is increased, as a result of which greater pressure-dependent time-of-flight differences can be attained. If the guided wave is guided from the vibration transducer to the further vibration transducer, this can be achieved for example by way of a helical guidance of the guided wave around the measurement pipe.

Multiple circulation of the guided wave around the measurement pipe, however, is also possible if the guided wave is guided back to the same vibration transducer that excited it. The guided wave is able to be guided at least once along the propagation path back to the vibration transducer and past it in order to be guided a further time to the vibration transducer, wherein the control device can be set up such that the measurement data or at least parts of the measurement data are captured when the guided wave is guided back said further time to the vibration transducer. In other words, at least parts of the measurement data are consequently captured only once the guided wave passes the exciting vibration transducer again, that is to say for example once the guided wave is guided back to the vibration transducer a second or third time. For example, the guided wave can be excited with a pulse-type envelope and the control device can detect the guided wave respectively passing the vibration transducer on the basis of data which have been captured by way of the vibration transducer and count the number of passes. The measurement data can be captured exclusively or at least partially after a specific number of preceding passes. It is also possible to capture measurement data at a plurality of time points, in particular after different numbers of preceding passes. The signals captured in the process can be evaluated together or independently from one another, in particular in order to validate an ascertained pressure or to improve a measurement accuracy, for example by forming an average. Alternatively, capturing the guided wave can be stopped for example for a specific time interval after it has been emitted. Said time interval can be selected such that the measurement data are captured only after a plurality of circulations of the guided wave around the measurement pipe.

In accordance with again an added feature of the invention, the control device, the side wall and the vibration transducer are set up such that a Rayleigh wave, a quasi-Scholte wave or a Lamb wave is excited as the guided wave. A Rayleigh wave is a surface wave in the case of which substantially only one side of the side wall vibrates. If the vibration transducers are arranged on a side of the side wall that is remote from the measurement volume, it is possible to ensure hereby that substantially no vibration energy is transferred to the guided fluid. It is possible hereby to avoid additional propagation paths and attenuation of the guided wave.

Rayleigh waves are excitable for example in particular if the thickness of the side wall is significantly greater than the wavelength of the guided wave in the solid body. In some cases of application, it may be advantageous, for example in order to reduce attenuation of the wave, to excite a Lamb wave instead, in the case of which both sides of the side wall vibrate symmetrically or asymmetrically with respect to one another in accordance with the excited vibration mode. The excitation should here preferably be effected at a frequency and wavelength at which substantially no energy is transferred from the side wall to the fluid. This can typically always be attained if the thickness of the side wall is sufficiently low and/or a sufficiently low excitation frequency is used. The Rayleigh angle, which describes an emission angle of a compression wave excited in the fluid, depends on the sine of the quotient of the phase velocity of the corresponding wave in the fluid and in the side wall. From this relationship, it is possible with known dispersion relation of the side wall to ascertain conditions in which no emission of a compression wave into the fluid is possible.

If the fluid used is a liquid, it is also possible to excite quasi-Scholte waves, which are guided along the interface between the fluid and the side wall.

The side wall can have at least in the region of the propagation path a constant thickness and/or an inner surface and/or an outer surface of the side wall can have in this region a constant curvature without a change in sign. In other words, the side wall can be smooth at least in the region of the propagation path. The guided wave can consequently be guided substantially without disturbance along the propagation path.

The measurement device can be embodied for example in the form of a flow meter, in particular an ultrasonic meter. The vibration transducer and/or the further vibration transducer can be used in the flow meter in a further operating mode to excite guided waves, which subsequently excite compressional vibrations in the fluid which are guided, via the fluid, to the respectively other vibration transducer or to an additional vibration transducer. In this case, it is possible by ascertainment of the time of flight or of the time-of-flight difference between the different transmission directions to determine a flow velocity and/or it is possible to ascertain further parameters of the fluid. As has been explained above, whether a guided wave is excited which excites pressure waves in the fluid or whether a guided wave is excited which excites substantially no pressure waves in the fluid can be dependent in particular on an excitation frequency. It is thus possible for example for the measurement device to be able to excite the vibration transducer or the further vibration transducer with different frequencies and/or for different excitation geometries to be implemented by way of a plurality of excitation elements of the individual vibration transducers, wherein a pressure measurement is performed in a first excitation mode and for example a flow measurement is performed in a second excitation mode.

With the above and other objects in view there is also provided, in accordance with the invention, a method for ascertaining a pressure in a measurement volume which receives a fluid or through which fluid flows, wherein the measurement volume is bounded at least sectionally by a side wall, the method comprising:

providing a vibration transducer arranged on the side wall and actuating the vibration transducer by a control device to excite a wave to be guided through the side wall;

guiding the wave is through the side wall along a propagation path back to the vibration transducer, or to at least one further vibration transducer, and capturing the wave at the vibration transducer or the at least one further vibration transducer in order to ascertain measurement data; and determining the pressure in the measurement volume by the control device in dependence on the measurement data.

In other words, the invention relates to a method for ascertaining a pressure in a measurement volume which receives a fluid or through which fluid flows, wherein the measurement volume is bounded at least sectionally by a side wall, wherein a vibration transducer is arranged on the side wall, wherein the vibration transducer is actuated by a control device to excite a wave that is guided through the side wall, wherein the guided wave is guided through the side wall along a propagation path back to the vibration transducer or to at least one further vibration transducer and is captured there by the control device in order to ascertain measurement data, wherein the pressure is ascertained by the control device in dependence on the measurement data. The method according to the invention can be developed with the features explained with respect to the measurement device according to the invention, and vice versa.

Other features which are considered as characteristic for the invention are set forth in the appended claims.

Although the invention is illustrated and described herein as embodied in a measurement device for ascertaining a pressure in a measurement volume, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
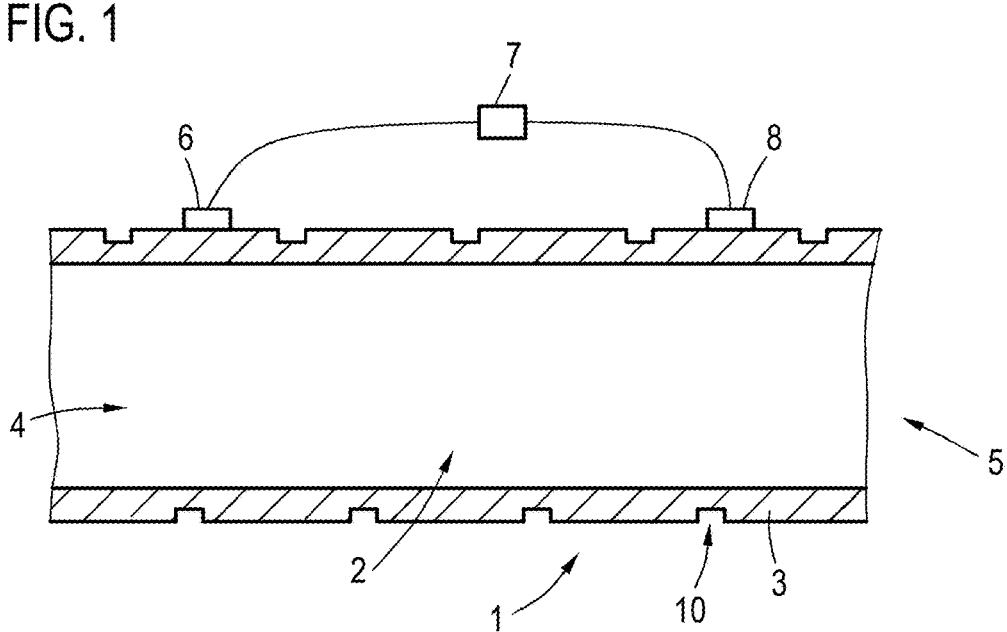
FIG. 1 is a longitudinal sectional view of an exemplary embodiment of a measurement device according to the invention.

Referring now to the figures of the drawing in detail and first, particularly, to FIG. 1 thereof, there is shown a sectional view of a measurement device 1 for ascertaining a pressure in a measurement volume 2 which receives a fluid or through which the fluid is able to flow. The measurement volume is bounded by the one side wall 3 which is embodied in the form of a measurement pipe. The latter can be in particular a measurement pipe of a flow meter. The fluid flows from a fluid inlet 4 to a fluid outlet 5, or it may be stationary in the measurement pipe. A vibration transducer 6 is actuable by a control device 7 to apply a guided wave in the side wall 3. The vibration transducer 6 can be, for example, a piezoelectric vibration transducer, which is excited to vibrations by way of an alternating voltage provided by the control device 7.

The frequency of the excitation can be selected for example such that Rayleigh waves are excited as the guided waves. In the case of these waves, substantially only one external surface of the side wall 3 which is remote from the measurement volume 2 vibrates. Alternatively, it would be possible to excite Lamb waves, in the case of which both side surfaces of the side wall 3 vibrate. In order to avoid attenuation of the guided wave by the fluid and limit possibilities for multi-path propagations, it is advantageous if the excitation frequency is here selected such that substantially no compression vibrations of the fluid are excited by the guided wave. This is always possible for the base vibrations of Lamb waves if the thickness of the side wall 3 is selected such that it is not too thick and/or a sufficiently low excitation frequency is used. In principle, it would also be possible to select the excitation frequency such that a quasi-Scholte wave is excited, that is to say a wave which is guided along the fluid-solid interface. For example, the excitation could be effected such that the wave propagation takes place substantially along the internal surface of the side wall 3 which faces the measurement volume 2.

The propagation velocity of the guided wave depends on the sound velocity or on the phase velocity for the guided wave in the side wall 3. Since this sound velocity or phase velocity depends on a stress in the side wall 3 due to the acoustoelastic effect, and because this stress in turn depends on the pressure of the fluid in the measurement volume 2, it is possible for the control device 7 to ascertain the pressure in the measurement volume 2 by ascertaining the propagation velocity, for example using time-of-flight measurement. To this end, the guided wave is guided through the side wall 3 along a propagation path to a further vibration transducer 8, by way of which the control device 7 ascertains measurement data, after which the pressure is ascertained by the control device 7 in dependence on said measurement data. For example, a time of flight of the guided wave from the vibration transducer 6 to the vibration transducer 8 can be measured.

It would be possible in principle to ascertain the time of flight of the guided wave for a propagation path which extends directly from the vibration transducer 6 to the further vibration transducer 8. However, in order to obtain a great measurement accuracy, it is advantageous if the propagation path is relatively long, because as the time of flight for the guided wave from the vibration transducer 6 to the further vibration transducer 8 increases, the time-of-flight differences due to the stress in the side wall 3 and consequently due to the pressure in the measurement volume 2 increase. At the same time it is advantageous if the propagation path is guided at least once, preferably several times, around the measurement pipe, which is formed by the side wall 3, or around the measurement volume 2. It can be ensured hereby that an anisotropic pressure exertion by the fluid, for example due to a flow guidance of the fluid in the measurement pipe or due to a turbulent flow, does not disturb the pressure measurement, because all sides of the measurement pipe contribute to the measured overall time of flight.

Figure 2:
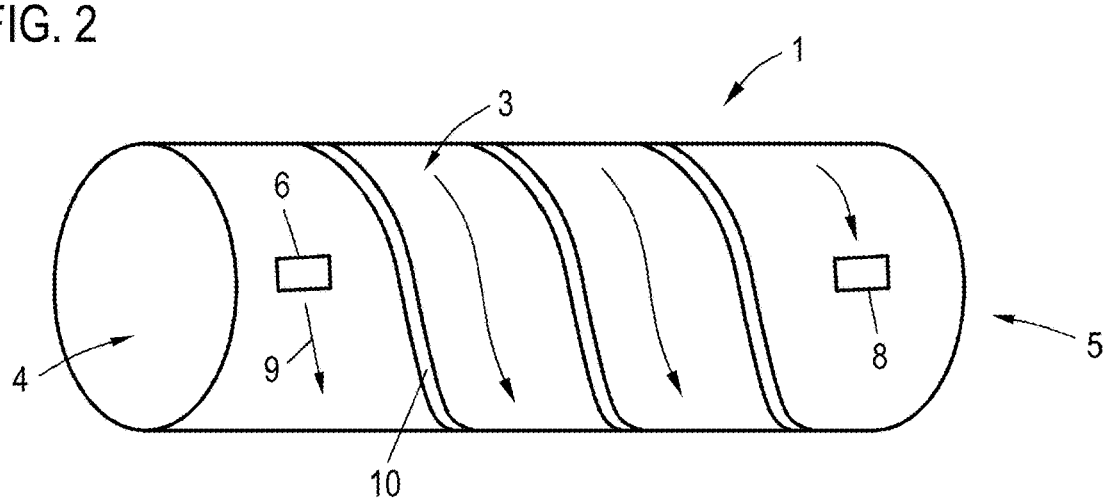
FIG. 2 is a side perspective view thereof.
Figure 3:
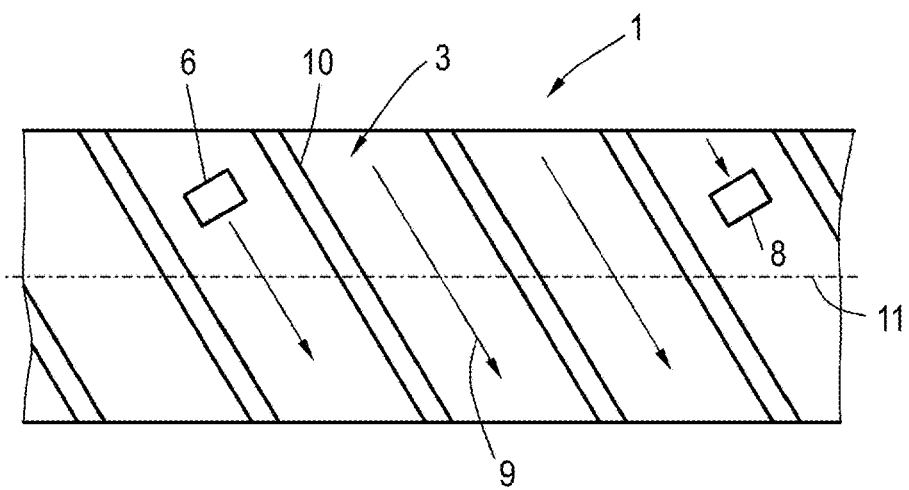
FIG. 3 is a developed, unrolled view of the pipe surface.

In order to attain both these advantages, the propagation path extends helically around the measurement pipe 3 or the measurement volume 2. This will be explained in more detail below with reference to FIGS. 2 and 3. FIG. 2 shows an external view of the measurement pipe and FIG. 3 schematically shows the unrolled surface of the measurement pipe. A point at the lower edge of the illustration of the side wall 3 in FIG. 3 thus corresponds to a point at the upper edge in the same position in the transverse direction in FIG. 3. The region above the dashed line 11 corresponds to the side of the measurement pipe that is illustrated in FIG. 2 and the region below the dashed line 11 corresponds to the rear side.

The arrows 9 show the desired, helical propagation path. Such a propagation path can be attained by way of a helical reflection element 10 being provided on the side wall 3, which reflection element 10 is realized by a helical cutout in the side wall 3. Due to the step-type thickness change of the side wall 3 at the edges of the reflection element 10, a guided wave that is incident on the reflection element 10 is largely reflected. Hereby it can be ensured that the guided wave is guidable from the vibration transducer 6 to the further vibration transducer 8 exclusively along the propagation path that is shown by the arrows 9.

Rather than a pure reflection of the guided wave at the reflection element 10, it is also possible to realize the reflection such that the reflected wave is attenuated. It is possible hereby to suppress multi-path propagation. An attenuation of the reflected wave can be possible for example by way of the dimensions of the cutout being matched to the wavelength of the guided wave. Due to a reflection on both edges of the cutout, it is possible to realize an at least partial cancellation of the reflected guided wave.

Figure 4:
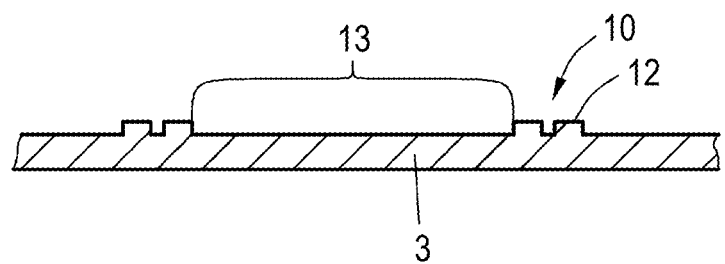
FIGS. 4 and 5 are partial sectional side views illustrating two alternative embodiments of a reflection element.

Alternatively to a cutout, it is also possible to use as the reflection element 10 a protrusion of the side wall. FIG. 4 shows an alternative exemplary embodiment, in which the side wall 3 has two protrusions 12 forming the reflection element 10. The propagation path can in that case extend in the region 13. Rather than two protrusions 12, only a single protrusion 12 could also be used as the reflection element 10, or three or more protrusions can be used. Even when using cutouts as reflection element 10, a plurality of cutouts can be used. Using a plurality of protrusions or a plurality of cutouts or a mixture between protrusions and cutouts as the reflection element 10, can serve to improve the degree of reflection and/or an attenuation of the reflected wave or to reduce transmission through the reflection element 10.

Figure 5:
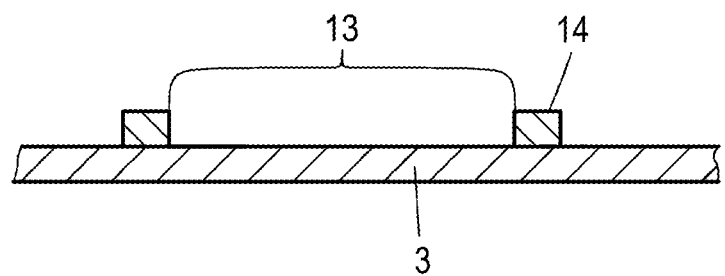

FIG. 5 shows a further possibility for bounding the region 13 in which the propagation path extends. In this case, separately formed attenuation elements 14 are attached to the side wall 3, for example by way of adhesive bonding. The attenuation elements 14 can consist for example of an elastic material having high internal friction, for example of a rubber or an elastomer.

Using two vibration transducers 6, 8 on the side wall 3 has the advantage that the vibration transducers 6, 8 can additionally be used to capture flow velocities, flow volumes or other fluid variables of the fluid that is located in and flows through the measurement volume 2. This can be attained for example by way of the control device 7 actuating the vibration transducer 6 with a different excitation frequency, by way of which a Lamb wave in the side wall 3 is excited. The excitation frequency can in this case be selected such that a pressure wave can be excited in the fluid, and said pressure wave can be guided via the fluid to the side wall in the region of the further vibration transducer 8 and be captured there. In dependence on the time of flight of the guided wave from the vibration transducer 6 to the further vibration transducer 8 or in dependence on a time-of-flight difference between this transmission and the reverse transmission direction, a flow velocity can be determined. This procedure is known in the field of ultrasonic flow meters and shall not be explained in detail. Flow meters can thus be modified with minor technical outlay to additionally permit a pressure measurement.

In alternative embodiments, which will be discussed below with reference to FIGS. 6 to 9, it is also possible to use only one single vibration transducer. The propagation path in this case is selected or bounded such that the guided wave is guided back to the vibration transducer 6. For elements having the same function, the same reference signs are used here as in the preceding examples.

Figure 6:
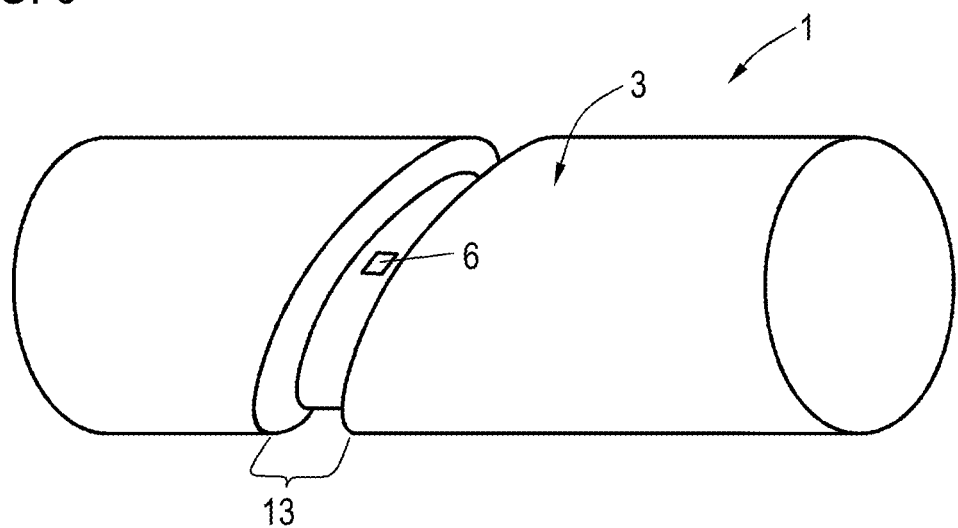
FIG. 6 is a perspective view of an alternative embodiment of the invention with a single vibration transducer.
Figure 7:
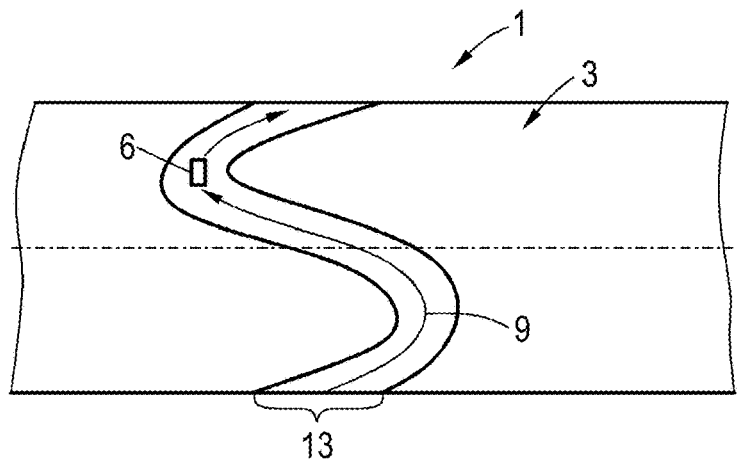
FIG. 7 is a view of an unrolled surface thereof.

FIGS. 6 and 7 show an exemplary embodiment in which the propagation path shown by way of the arrows 9 is guided along an elliptical ring around the measurement pipe that is formed by the side wall 3. Here, FIG. 6 shows a plan view of the measurement pipe, and FIG. 7 shows the unrolled external surface of the side wall 3. The region 13 within which the guided wave is guided, is formed as before by way of the guided wave being reflected or attenuated at the edge of said region. However, in the exemplary embodiment shown in FIGS. 6 and 7, this is achieved by way of the side wall in the region 13 of the propagation path having a different wall thickness, that is to say being thinner, than in the further regions of the side wall, that is to say in particular than in a section of the side wall that is adjacent to the region 13 of the propagation path. Due to an abrupt change in wall thickness, the impedance for the guidance of the guided wave changes abruptly, as a result of which the guided wave is largely reflected.

In an alternative implementation of the measurement device 1, the region 13 could also be bounded, as previously explained, by lateral reflection and/or attenuation elements 10, 14. It is also possible to use the boundary of the region 13 due to a variation in the wall thickness in cases where a plurality of vibration transducers 6, 8 are used. Rather than a reduction in wall thickness in the region 13, said wall thickness can also be increased in the region 13.

Due to the bounding of the region 13, the guided wave that is emitted by the vibration transducer 6 can propagate substantially only along the propagation path that is shown by the arrow 9. The guided wave can preferably here be emitted only in one direction, for example by using interference effects that occur in the case of an excitation of the guided wave in a plurality of spaced-apart regions. However, it is also possible that a guided wave is emitted in the direction of the arrows 9 and also in the opposite direction.

The guided wave, after it has travelled around the measurement pipe, returns to the vibration transducer 6. The resulting vibration of the vibration transducer can be captured by the control device 7 in the form of measurement data or part of the measurement data. In particular, a travel time for the circulation around the measurement pipe by the guided wave can be captured.

As has already been explained, the measurement accuracy of the pressure measurement can be potentially increased if a relatively long propagation path is used. An extension of the propagation path can be achieved in the example shown in FIGS. 6 and 7 by way of the guided wave travelling around the measurement pipe a plurality of times before the measurement data or at least parts of the measurement data are captured. In other words, the guided wave is guided at least once to the vibration transducer 6 and past it in order to be subsequently guided a further time to the vibration transducer, wherein the control device 7 is set up such that the measurement data or at least parts of the measurement data are captured when the guided wave is guided back said further time to the vibration transducer 6. This can be achieved for example by way of the capturing of the measurement data being started only after a specific waiting period after the excitation of the vibration transducer 6 for emitting the guided wave. This can be selected on the basis of pre-trials or a calibration such that the measurement data are only captured once the guided wave is guided said further time to the vibration transducer 6. However, it is also possible that the control device 7 respectively detects via the vibration transducer 6 when the guided wave reaches the vibration transducer 6. Hereby, the individual circulations around the measurement pipe can be counted by the control device 7, and it is possible for example to ascertain a travel time for two, three or four circulations, and the pressure can be ascertained in dependence thereon.

Figure 8:
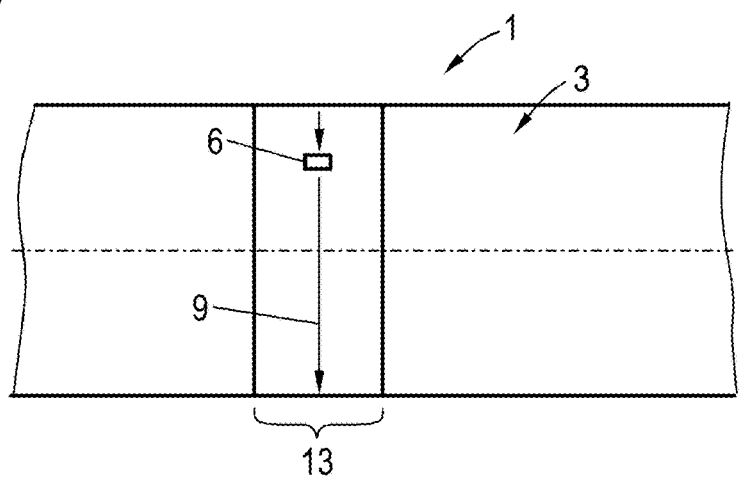
FIGS. 8 and 9 are plan views of further alternative embodiments.

The structure shown in FIGS. 6 and 7 can be simplified further. For example, it is possible, as is shown in FIG. 8, to use as the region 13 a ring which is perpendicular to the flow direction of the measurement pipe and within which the guided wave is guided, as is shown by the arrow 9. The region 13 can be bounded as explained previously. The setup shown in FIG. 8 makes possible an integration of a pressure measurement even for very short available pipe lengths or makes possible a particularly compact pressure meter. The path length of the guided wave until it returns to the vibration transducer 6 along the propagation path is smaller as compared to the exemplary embodiment shown in FIG. 7. This can be compensated by capturing the measurement data only after a plurality of circulations of the guided wave, as explained above.

Figure 9:
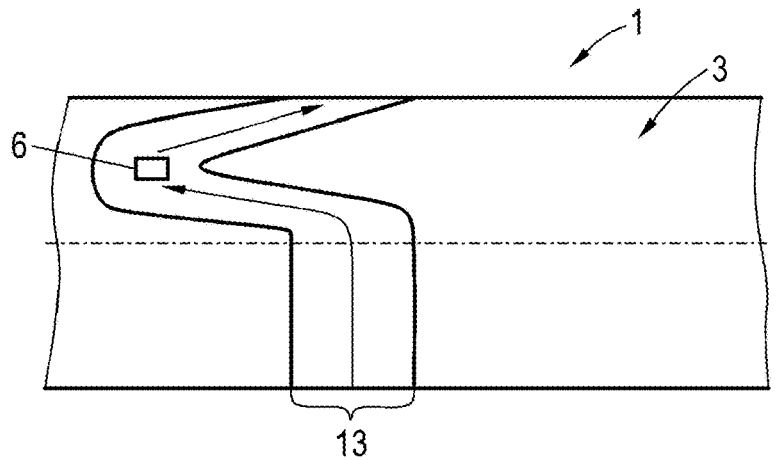

With a corresponding bounding of the region 13, for example by a variation in the wall thickness, by way of reflection elements 10 and/or attenuation elements 14, it is possible to specify a propagation path for the guided wave that has nearly any desired shape. One example of this is shown in FIG. 9, wherein the region 13 and consequently the propagation path in this case is guided conically around the measurement pipe 3. Of course, a multiplicity of different shapes would also be possible.

The following is a summary list of reference numerals and the corresponding structure used in the above description of the invention:

1 Measurement device
2 Measurement volume
3 Side wall
4 Fluid inlet
5 Fluid outlet
6 Vibration transducer
7 Control device
8 Vibration transducer
9 Arrow
10 Reflection element
11 Dashed line
12 Protrusion
13 Region
14 Attenuation element

The invention claimed is:

1. A measurement device for ascertaining a pressure in a measurement volume containing a fluid, the measurement device comprising:
   a side wall bounding at least a section of the measurement volume;
   a vibration transducer disposed on said side wall of the measurement volume;
   a control device configured to actuate said vibration transducer for exciting a wave to be guided through said side wall, wherein the guided wave is guided through said side wall along a propagation path back to said vibration transducer, or to a further vibration transducer connected to said control device, where the guided wave is captured and said control device ascertains measurement data; and
   wherein said control device is configured to determine the pressure in the measurement volume by way of a time-of-flight measurement in dependence on the measurement data and ascertain a time period until the guided wave returns along the propagation path to the vibration transducer or until it reaches the further vibration transducer;
   wherein the side wall forms a measurement pipe surrounding measurement volume, and wherein said propagation path extends at least once in the circumferential direction around the measurement pipe.

2. The measurement device according to claim 1, wherein said side wall has at least one attenuation element configured to attenuate the guided wave.

3. The measurement device according to claim 2, wherein said side wall further has at least one reflection element configured to at least partially reflect the guided wave.

4. The measurement device according to claim 3, wherein said sidewall is formed with at least one cutout and/or with at least one protrusion forming said attenuation element and/or said reflection element.

5. The measurement device according to claim 4, wherein the propagation path is laterally bounded at least in one section of the propagation path by said attenuation element and/or said reflection element.

6. The measurement device according to claim 1, wherein said side wall has at least one reflection element configured to at least partially reflect the guided wave.

7. The measurement device according to claim 6, wherein said reflection element is formed by at least one cutout formed in said side wall and/or by at least one protrusion on said side wall.

8. The measurement device according to claim 6, wherein the propagation path is laterally bounded at least in one section of the propagation path by said reflection element.

9. The measurement device according to claim 1, wherein the side wall has a different wall thickness in a region of the propagation path than in a section of the side wall adjacent the region of the propagation path.

10. The measurement device according to claim 1, wherein the guided wave is guided along the propagation path at least once back to said vibration transducer and past said vibration transducer in order to be guided once more to said vibration transducer, and wherein said control device is configured to capture the measurement data, or at least portions of the measurement data, when the guided wave is guided back once more to said vibration transducer.

11. The measurement device according to claim 1, wherein said control device, the side wall and said vibration transducer are configured to excite the guided wave in the form of a wave selected from the group consisting of a Rayleigh wave, a quasi-Scholte wave and a Lamb wave.

12. The measurement device according to claim 1, wherein said side wall has, at least in a region of the propagation path, a constant wall thickness.

13. The measurement device according to claim 12, wherein an inner surface and/or an outer surface of said side wall has, at least in a region of the propagation path, a constant curvature without a change in sign.

14. The measurement device according to claim 1, wherein an inner surface and/or an outer surface of said side wall has, at least in a region of the propagation path, a constant curvature without a change in sign.

15. A method for ascertaining a pressure in a measurement volume which receives a fluid or through which fluid flows, wherein the measurement volume is bounded at least sectionally by a side wall, the method comprising:
   providing a vibration transducer arranged on the side wall and actuating the vibration transducer by a control device to excite a wave to be guided through the side wall;
   guiding the wave through the side wall along a propagation path back to the vibration transducer, or to at least one further vibration transducer, and capturing the wave at the vibration transducer or the at least one further vibration transducer in order to ascertain measurement data; and
   determining the pressure in the measurement volume by the control device by way of the time-of-fight measurement in dependence on the measurement data and ascertaining a time period until the guided wave returns along the propagation path to the vibration transducer or until it reaches the further vibration transducer; and
   providing a measurement pipe surrounding the measurement volume formed by the side wall, where the propagation path extends at least once in the circumferential direction around the measurement pipe.

\* \* \* \* \*